United States Patent Office 2,840,503
Patented June 24, 1958

2,840,503
SOIL FUMIGATION

Richard R. Whetstone, Denver, Colo., and Seaver A. Ballard, Orinda, Calif., assignors to Shell Development Company, New York, N. Y., a corporation of Delaware No Drawing. Application February 20, 1956
Serial No. 566,345

11 Claims. (Cl. 167—39)

This invention pertains to a method for amending agriculture soils to combat phytopathogenic soil-borne organisms, and to novel compositions of matter suitable therefor. More particularly, the invention pertains to a method for treatment of agricultural soils inhabited by phytopathogenic soil-borne organisms, such as fungi, nematodes and bacteria, in order to protect plants against attack by these pathogens. Economical and practical compositions of matter adapted to this purpose also form an aspect of the invention.

It is well known that most if not all agricultural soils are normally inhabited by various species of organisms that are injurious to plants. The root systems of seedlings growing in the soil, and even of mature plants, are susceptible to attack by these organisms. The effect of the infestation of the soil, when it is severe, is to reduce greatly the yield of any crop planted in the soil and often may be sufficient to make planting of the soil with a given crop wholly uneconomical.

Because these pathogenic organisms inhabit the soil itself and attack the subterranean portions of the plants, it has been found that the only practical method for combating them is to introduce into the soil a material toxic to the organisms in question. However, whereas a considerable variety of materials has been found to be toxic in vitro to the various phytopathogenic organisms that are involved, only a limited number have been found to have any practical value for application in the field. For field application, the material in question must of course be economically practical from the standpoint of its cost. Of perhaps even greater importance it must be capable of use without adverse effects upon plants growing in the soil either at the time of application or later. It should not yield phytotoxic products or products which would be absorbed by the plant and render the plant tissues themselves unsuitable for their intended use, for example, as edible crops. The material applied to the soil must be effective at a reasonable concentration in the soil and desirably is one that can be used without undue danger to warm-blooded animals. The material introduced into the soil should act rapidly and should be easily distributed throughout the body of the soil as by diffusion. It should not, however, diffuse so rapidly that it will be lost from the soil before it has exerted its beneficial effects.

The present invention is based upon the discovery that certain unsaturated organic esters are highly effective for combatting phytopathogenic organisms in agricultural soils. By disseminating these unsaturated esters into the infested soil, the incidence of attack on plants by pathogenic organisms can be greatly reduced and in some cases completely eliminated. As a result, healthier crops can be grown in the treated soil. Substantial increases in yields of crop per acre have been obtained.

In accordance with the present invention, agricultural soil infested with such phytopathogenic organisms as fungi, nematodes and bacteria is treated by disseminating into it a substituted low molecular weight olefin characterized by the presence of a plurality of carboxylic ester substituents, or acyloxy substituents, directly substituted on the olefin residue.

In accordance with a more limited aspect of the invention, the treatment of the agricultural soil is carried out by the disseminating into the soil a substituted low molecular weight olefin dicarboxylate having at least one of the two acyloxy substituents in the allyl position relative to the carbon-to-carbon olefinic bond, i. e., the configuration

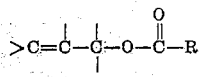

In one of the preferred aspects of the invention, the unsaturated ester is a substituted low molecular weight olefin having two acyloxy substituents substituted on the olefin residue in the geminate position relative to each other and in the allyl position relative to the olefinic carbon-to-carbon bond. That is to say, in accordance with this preferred aspect, there is employed a lower 2-alkenylidene dicarboxylate, i. e., the configuration

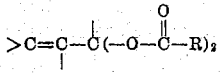

In accordance with a second preferred aspect of the invention, there is employed as the unsaturated ester a substituted lower olefin containing two acyloxy substituents, one of which is in the allyl position relative to the olefinic carbon-to-carbon bond and the other of which is in the vinyl position relative to the same carbon-to-carbon unsaturated linkage, that is, lower 2-alkylene-1,3-dicarboxylates, e. g.

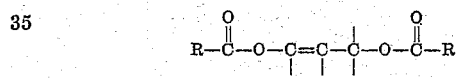

In the above formula R is aromatic or aliphatic hydrocarbon as will hereinafter appear.

The low molecular weight olefins, to which the acyloxy substituents are attached, preferably do not contain more than 8 carbon atoms and have the unsaturation in the allyl position relative to at least one of the acyloxy substituents. Such compounds are illustrated by the acetate of 6-acetoxy-2-hexen-1-ol, the butyrate of 5-butyryloxy-2-penten-1-ol, and the propionate of 6-propionyloxy-2-hexen-1-ol, and homologs and analogs thereof. More preferred are the low molecular weight olefins having from 3 to 4 carbon atoms in a straight chain with the unsaturation in the same relative position as previously indicated. Compounds of this type include various esters of butene-2 and propene-2 such as 1,4-diacetoxybutene-2, 1,2-diacetoxybutene-2, 1,3-diacetoxypropene and the like. Especially effective for the treatment of agricultural soils are those toxic agents wherein one of the carboxylic ester groups is in the allyl position relative to the carbon-to-carbon unsaturated linkage of the substituted olefin and the other carboxylic ester linkage is in the vinyl position relative thereto. The esters of this latter type are illustrated by 1,3-diacetoxypropene, 1,3-diacetoxy-2-methylpropene, 1,3-diacetoxy-2-chloropropene and their homologs and analogs.

Germinate dicarboxylic diesters having both of the carboxylic ester linkages in the allyl position relative to the olefinic bond are represented by allylidene diacetate and its homologs and analogs. There can be employed such esters wherein the allylidene group is substituted by a lower hydrocarbon group, such as the methyl group, the ethyl group, the propyl group, the isopropyl group, a butyl group, or a pentyl group, the hydrocarbon substituent or substituents preferably containing not over about 8 carbon atoms. Aromatic and alicyclic substituents, such as the phenyl group, the cyclohexyl group, the cyclopentyl group, the tolyl group and the benzyl group are also operable. One or more atoms of halogen may be present instead of or in addition to the hydrocarbon substituents on the allylidene residue. Although the presence of substituents does not destroy the operability of the compounds in question, it has been observed that the presence or absence of a substituent on the No. 2 carbon atom of the allylidene group does have a rather remarkable effect upon their effectiveness as agents for treating soil, in that the diesters which have a hydrogen atom bonded to the No. 2 carbon atom are notably more effective than those wherein the No. 2 carbon atom is substituted, as by an alkyl group or a halogen atom. Where the allylidene group is substituted the group preferably contains not over approximately 10 carbon atoms. Those geminate diesters containing the unsubstituted allylidene group or the unsubstituted 2-butenylidene group are in general among the most readily available of the toxic agents utilized in accordance with the invention, and the unsubstituted allylidene dicarboxylates are particularly preferred.

In so far as is known, the choice of the particular carboxylic acid group is not critical. From the standpoint of cost and availability the acetates are highly satisfactory. Higher fatty acid esters may be used, such as propionates, butyrates, valerates, pelargonates, caprates, acrylates, oleates, and their homologs and analogs. Aromatic esters, such as benzoates, dichlorobenzoates and toluates, may be employed, although it is preferred to employ the esters derived from the lower fatty acids containing preferably no more than about 6 carbon atoms in the acyloxy residue.

Illustrative compounds which can be employed for fumigating agricultural soil in accordance with the present invention include such allylidene diesters as allylidene diacetate, allylidene dipropionate, allylidene dibutyrate, allylidene acetate butyrate, allylidene propionate valerate, and allylidene dipelargonate. Substituted allylidene diesters which can be employed include, among others, 2-methyl allylidene diacetate, 2-butenylidene dipropionate, 2-butenylidene acetate butyrate, 2-pentylidene dipropionate, 2-chloroallylidene diacetate, 2-methyl allylidene acetate butyrate, and 2-ethyl allylidene dipelargonate.

Illustrative unsaturated esters of the mixed vinyl and allyl type which can be employed in accordance with the invention include 1,3-diacetoxypropene, 1,3-diacetoxy-2-methylpropene, 1,3-divaleroxy-2-phenylpropene, 1,3-diacryloxy - 2 - neopentylpropene, 1,3 - dibutyroxypropene, 1,3-diacetoxy-2-butene, 1,3-diacryloxypropene, 1,3-diacetoxy-2-chloropropene and 1-acetoxy-3-butyroxy-2-pentene. Of these and their equivalents, the preferred toxic agents are those wherein the two ester groups are substituted upon an otherwise unsubstituted propene residue.

Treatment of infested agricultural soil can be carried out by disseminating the toxic agent into the soil by spraying, atomization, injection, percolation or other methods known to be effective for introducing materials into the subsurface portions of soil. The toxic agents may be employed in the pure state, that is to say, without diluents, extenders or other adjuvants or they may be dissolved, suspended, dispersed, emulsified or absorbed in or upon a suitable carrier as adjuvant therefor, such as a liquid dispersant or suspending medium or a solid carrier. Where the unsaturated diester is to be introduced as such into the soil this may be done simply by punching holes into the soil, say, at one-foot intervals, and to a depth of 6 to 12 inches, and pouring a measured amount of the toxic agent into the holes. For larger scale applications, subsoil injectors of any suitable type, either hand operated or mechanically operated, may be used. For introduction with a diluent or extender, there may be employed any of the various horticultural adjuvants, such as an organic solvent for the unsaturated esters, an aqueous emulsion or suspension or a finely divided solid upon which the toxic agent is absorbed or adsorbed. The carrier preferably should be substantially neutral in acid-base reaction and in any event preferably will have a pH value of about 7 or below.

Liquid diluents which can be employed with the toxic agents of the invention include such known adjuvants as liquid hydrocarbon agricultural oils, preferably hydrocarbon spray oils having boiling ranges within a range of from about 205° C. to about 500° C. The solution may be applied as such to the soil or it first may be suspended, dispersed or emulsified in water with the aid of known surface active agents to produce a suspension, dispersion, or emulsion which then can be disseminated into the soil. When the toxic agent is employed in such a diluted form, the solution, dispersion, suspension or emulsion may be applied to the surface of the soil and then washed down into the soil by irrigation or it may be injected directly into the soil below the surface thereof. The term "disseminating" is used to include both these and equivalent methods for introducing the toxic agents into the soil.

The unsaturated esters used for treating soil in accordance with the invention may be absorbed or adsorbed on solid carriers, such as kieselguhr, talc, bentonite, clay, pumice, bauxite, wood flour, etc., and the solid composition worked into and mixed with the soil with the aid of agricultural equipment suitable for the purpose, as during cultivation or fertilization. The dust or powder may be compacted into pellets which will disintegrate upon contact with water and the pellets dropped into a furrow behind a plow. Regardless of the method of application, the toxic agents of this invention may be employed singly or in combination with each other or in combination with known soil amenders, such as ethylene dibromide, the mixture of chlorinated propenes sold by Shell Chemical Corporation and known as "D-D," ethylene chlorobromide, and agricultural fertilizers.

The rate of application to the soil will depend upon various factors, such as the type of soil that is to be treated, that is to say, whether sandy, clayey or loamy, as well as upon the kind and severity of infestation of the soil. Rates of application of from about ¼ to 20 or more gallons per acre may be employed according to the circumstances. When the toxic agent is to be applied in diluted form, the concentration thereof in the formulated composition may be from within the range of 0.5% by weight to 50% or more by weight. For example, an especially convenient emulsifiable concentrate will contain from about 10% by weight up to about 50% by weight of the toxic agent of the invention, the balance being made up of a hydrocarbon spray oil as solvent for the toxic agent and a surface active agent in an amount sufficient to promote emulsification of the mixture in water. The emulsifiable concentrate may be diluted with water to form an emulsion containing from about 1 to 5% or more of the toxic agent for application to the soil by spraying or flooding. Such emulsions may be formed in irrigation water and the treatment of the soil thus carried out concurrently with the normal irrigation.

The treatment of the soil can be carried out either prior to planting of the soil or after the mature plants have become established in the soil. In order to reduce the possibility that established plants would be injured by highly localized concentrations, it is preferred to apply the treatment prior to planting of the soil.

The following examples are presented for the purpose of illustrating the invention. It will be understood that the examples should not be misconstrued as limiting the invention as is defined by the hereto appended claims.

Example I

In this example, 1,3-diacetoxypropene was employed for the treatment of soil to be used for growing pinto beans. The test was made in the central portion of the San Joaquin Valley, California, using soil containing the fungal complex native to the locality, predominant members of the complex being *Rhizoctonia solani, Pythium ultimum,* and *Fusarium solani.* The 1,3-diacetoxypropene was applied as an aqueous emulsion having the following composition: 92% water (by volume), 3.6% 1,3-diacetoxypropene and 2.2% emulsifying agent. The emulsifying agent is a composition of about 40% "B–1956," about 10% Triton X–100 and about 50% Triton X–155, all products of Rohm and Haas. Application of the emulsion to the soil was by spraying into the row simultaneously with machine planting of the beans, at the rate of about 0.16 ml. of 1,3-diacetoxypropene per foot (equivalent to about 1 gallon per acre) or about 11 gallons of emulsion per acre. The percentage germination of the seed was determined by count six days after the simultaneous planting and treatment. A control plot was planted simultaneously but without the application of 1,3-diacetoxypropene. In the portion of the field treated with 1,3-diacetoxypropene, the germination was increased by 135% over that in the control plot.

Example II

A test similar to that described in Example I was carried out using allylidene diacetate as the fungitoxic material. Compared to the control plot, the germination of the planted seeds was increased by 155%.

Example III

In a second series of tests, carried out similarly to those described in Examples I and II, allylidene diacetate and 1,3-diacetoxypropene were applied to separate plots simultaneously with machine plantings of pinto beans, while a third plot was planted without application of fungicide. The allylidene diacetate and 1,3-diacetoxypropene were applied at the rate of 0.16 ml. per foot of row (equivalent to 1 gallon per acre) in an emulsion having the following composition: 92% water (by volume), 3.6% 1,3-diacetoxypropene and 2.2% emulsifying agent. The emulsifying agent is a composition of about 40% "B–1956," about 10% Triton X–100 and about 50% Triton X–155, all products of Rohm and Haas. Ten days after the planting, the seedlings were removed from the soil and the attack by fungi determined by visual examination of the seedlings by an experienced mycologist, with rating of the individual plants as either healthy, with early lesions just apparent or with large lesions or complete girdling of the stem present. From these readings there was calculated the disease index, a statistical index increasing from 0 to 100 with increasing severity of attack by fungi. The effectiveness of the toxic agent, compared to the untreated control plot, thus is shown by the percentage of disease control which is the numerical value of the quotient $$\frac{DI_c - DI_t}{DI_c}$$

in which $DI_c$ and $DI_t$ represent the disease index for the control and the treated plots, respectively. In the present tests, there were obtained the values shown in the following table, which show that in both instances there was obtained a great reduction in the incidence and severity of attack.

| Toxic agent: | Percentage disease control |
|---|---|
| Allylidene diacetate | 80.5 |
| 1,3-diacetoxypropene | 73.6 |

Example IV

The efficacy of the unsaturated esters with which the invention is concerned on destroying nematodes is illustrated by this example. A measured amount of the selected compound was mixed into a sample of soil heavily infested with the rootknot nematode, *meloidogyne* species. The soil then was maintained in a closed vessel at about 60° F. for 48 hours and then in an open vessel for one week. The soil was then examined to determine the number of living nematodes remaining in the soil. By a series of tests using varying amounts of the toxic agent, the "minimum lethal dosage" was determined. This is the minimum dosage at which all of the nematodes were killed. The following results were obtained:

| Test chemical: | Minimum lethal dosage, ml. of test chemical per liter of infested soil |
|---|---|
| 1,3 - diacetoxypropene | 0.2 |
| Allylidene diacetate | .2 |

Example V

Allylidene diacetate, disseminated into soil at a concentration of 100 parts per million, completely destroyed *Fusarium solani pisi* with which the soil was infested, the test being conducted at the ambient temperatures (60° F. to 100° F.) and the fungus count being taken three days after introduction of the toxic agent. The same concentration of allylidene diacetate killed *Phytophthora cactorum* under similar test conditions. A concentration of 50 parts per million of soil was effective in completely destroying *Verticillium alboatrium* in soil infested with it. In each case, control samples of the infested soils contained an abundant growth of the fungi under the test conditions.

Example VI

This example illustrates use of the toxic agents as dusts. The tests were carried out using field soil infested with a naturally occurring fungal complex comprising predominantly *Rhizoctonia solani, Pythium ultimum* and *Fusarium solani.* 1,3-diacetoxypropene was uniformly adsorbed on a portion of the infested soil, which was loamy in character and had been sieved to remove coarse particles. The soil containing the 1,3-diacetoxypropene then was mixed in the dry state with the infested soil in which the test plantings were to be made. The soil prepared in this manner then was planted with pinto beans. Germination count was made 8 days after planting. The percentage of disease control was determined as described in Example I 21 days after planting. With 1,3-diacetoxypropene applied at the rate of 0.24 ml. per foot (equivalent to 1.5 gallons per acre at 22-inch spacing between the rows) the percentage germination was 83.5 and the disease control was 100%. There was no evidence of phytotoxic action to the plants by the 1,3-diacetoxypropene.

Example VII

The effectiveness of the toxic agents with which this invention is concerned against cotton root rot is illustrated by this example. Soil infested with a cotton root rot complex predominating in *Rhizoctonia* and *Thielaviopsis* was planted with cotton and simultaneously sprayed with an emulsion having the following composition: 3.6% 1,3-diacetoxypropene and 2.2% emulsifying agent. The emulsifying agent is a composition of about 40% "B–1956," about 10% Triton X–100 and about 50% Triton X–155, all products of Rohm and Haas. The sprayed soil then was covered from the side in a manner simulating the action of a machine planter. With application of the spray at a rate equal to 0.16 ml. 1,3-diacetoxypropene per lineal foot of row there was obtained 90% germination of the cotton and 89.2% disease control. There was no evidence of phytotoxicity to the cotton plants.

By following the procedures described in the examples it will be found that other substituted low molecular weight olefins characterized by a plurality of acyloxy substituted groups directly attached to the olefinic residue are likewise effective against common soil-borne fungi, nematodes and bacteria such as *Rhizoctonia solani, Pythium ultimum, Fusarium solani, Verticillium alboatrium* and the cotton root rot *Thielaviopsis*. Such compounds include the propionate of 6-propionyloxy-2-hexen-1-ol, 1,4 - diacetoxybutene - 2, 1,3 -diacetoxy - 2 - methylpropene, 1,1-diacetoxyheptene-2, 1,3-diacetoxy-2-chloropropene, and the like.

We claim as our invention:

1. In the treatment of agricultural soil infested with phytopathogenic organisms, the step which comprises disseminating into the infested soil a substituted low molecular weight olefin characterized by the presence of a plurality of acyloxy substituent groups directly attached to the olefinic residue said olefinic residue having not more than 8 carbon atoms, in a concentration toxic to said phytopathogenic organisms.

2. In the treatment of agricultural soil infested with phytopathogenic organisms, the step which comprises disseminating into the infested soil a substituted low molecular weight olefin characterized by the presence of two acyloxy substituents at least one of which is substituted in the allyl position relative to a carbon-to-carbon olefinic bond said olefin having not more than 8 carbon atoms per molecule, in a concentration toxic to said phytopathogenic organisms.

3. In the treatment of agricultural soil infested with phytopathogenic organisms, the step which comprises disseminating into the infested soil an olefinically unsaturated geminate dicarboxylic diester wherein two geminate diester groups are in the allyl position relative to the carbon-to-carbon olefinic bond there being not more than 8 carbon atoms in the olefinic group to which said ester groups are attached, in a concentration toxic to said phytopathogenic organisms.

4. In the treatment of agricultural soil infested with phytopathogenic organisms, the step which comprises disseminating into the infested soil an olefinically unsaturated diester wherein one of the ester groups is in the allyl position relative to a carbon-to-carbon olefinic bond and the other of said ester groups is in the vinyl position relative to the same carbon-to-carbon olefinic bond there being not more than 8 carbon atoms in the olefinic group to which said ester groups are attached, in a concentration toxic to said phytopathogenic organisms.

5. In the treatment of agricultural soil infested with phytopathogenic organisms, the step which comprises disseminating into the infested soil an allylidene dicarboxylate wherein the allylidene group has not more than 8 carbon atoms in a concentration toxic to said phytopathogenic organisms.

6. In the treatment of agricultural soil infested with phytopathogenic organisms, the step which comprises disseminating into the infested soil a 2-alkenylidene dicarboxylate wherein the alkenylidene group has not more than 8 carbon atoms in a concentration toxic to said phytopathogenic organisms.

7. In the treatment of agricultural soil infested with phytopathogenic organisms, the step which comprises disseminating into the infested soil a 2-alkenylene-1,3 dicarboxylate wherein the alkenylene group has not more than 8 carbon atoms in a concentration toxic to said phytopathogenic organisms.

8. In the treatment of agricultural soil infested with phytopathogenic organisms, the step which comprises introducing into the soil the allylidene diester of a fatty acid having from 3 to 4 carbon atoms in the allylidene group in a quantity toxic to said phytopathogenic organisms.

9. A process in accordance with claim 8 wherein the diester is allylidene diacetate.

10. In the treatment of agricultural soil infested with phytopathogenic organisms, the step which comprises introducing into the soil a 1,3-propenylene dicarboxylate in a quantity toxic to said pathogenic organisms.

11. A process in accordance with claim 10 wherein the dicarboxylate is 1,3-acetoxypropene.

References Cited in the file of this patent

UNITED STATES PATENTS

| 2,419,073 | Hammer | Apr. 15, 1947 |
| 2,532,558 | Kirby | Dec. 5, 1950 |
| 2,575,896 | Smith et al. | Nov. 20, 1951 |

OTHER REFERENCES

King: U. S. Dept. of Agriculture Handbook, No. 69, May 1954, p. 92, items No. 2498 and 2499.